Nov. 19, 1957 G. H. CHENEY ET AL 2,813,421
WIND TUNNEL PRESSURE PICK-UPS
Filed July 19, 1954

INVENTORS.
GORDON H. CHENEY
JOHN H. RUSSELL
PHILIP C. WHITENER
BY Reynolds, Beach & Christensen
ATTORNEYS United States Patent Office 2,813,421
Patented Nov. 19, 1957

2,813,421

WIND TUNNEL PRESSURE PICK-UPS

Gordon H. Cheney, John H. Russell, and Philip C. Whitener, Seattle, Wash., assignors to Boeing Airplane Company, Seattle, Wash., a corporation of Delaware Application July 19, 1954, Serial No. 444,268

6 Claims. (Cl. 73—147)

In wind tunnel test work, particularly in the transonic and supersonic ranges, it has been found desirable to record static pressure at various places along the wall of the test section of the wind tunnel's throat. Heretofore such pressures have been determined and recorded by providing a series of holes in the wall of the wind tunnel throat aligned in the direction of air flow, with a tube permanently attached to each hole and with each tube connected to a manometer. An operator who watches the manometer board records the individual pressures which are measured by the several manometers. This is tedious and difficult work, and has definite limitations as to the amount of information that can be obtained, and obviously as to the time required to obtain it. Furthermore, time is such a factor that often before a complete recording is obtained of the several holes, conditions have changed and the final readings are not in correct correspondence with conditions prevailing during the initial readings. Although it is common to photograph a bank of manometers, this still requires a sufficient delay to develop and print the photograph, which then must be coordinated with conditions existing at the time of the exposure.

It is the object of the present invention to provide a means whereby a large number of readings can be taken in such rapid succession that collectively and relatively they represent concurrent conditions, and can be recorded automatically by a stylus upon graph paper, thereby greatly speeding up the operation and eliminating the tedious work of the operator, as heretofore practiced, and giving readings which are instantly available, and are comparable because all are made without a significant lapse of time, rather than over an extended period.

More particularly, it is an object to provide the series of apertures through the wall of the wind tunnel, as before, through each of which the static pressure within may be sensed, and then to bring into registry with each such aperture in rapid succession a single pressure-sensing port within a carriage which traverses the line of holes. This port is connected to a recording instrument of known type, such as the Moseley Autograf supplied by the F. L. Moseley Co. of Pasadena, Calif., in which the pressure sensed at each aperture, and reproduced through a pressure transducer, causes relative deflection between a stylus and a chart or marking surface. Such a recorder plots $y=f(x)$ automatically, and almost instantaneously. The stylus is operatively connected to the ported carriage, so that the stylus traverses the marking surface in correspondence with the advancement of the carriage and its port along the line of apertures, and the marking surface is deflected with relation to a norm, in accordance with differences in the pressure sensed at the successive apertures, thereby giving a running graph of existing pressure relations within the length of the test section.

It is often desirable to obtain a reading in Mach numbers. In such case, the chart may be graduated in Mach numbers, and the chart, or the drum on which it is mounted, in addition to being operatively connected to the carriage's port for deflection in accordance with the instantaneous pressure at each individual port, is also operatively connected to an impact pressure pickup within the wind tunnel, so that the position of the chart with respect to the traveling stylus is in accordance with the ratio between the instantaneous or static pressure at any given point, and the impact pressure generally within the wind tunnel, giving a record reading directly in Mach numbers.

The invention will be better understood from a study of the accompanying drawings, wherein the invention is shown largely in diagrammatic fashion, and from study of the following specification and of the claims wherein the invention is defined.

Figure 2:
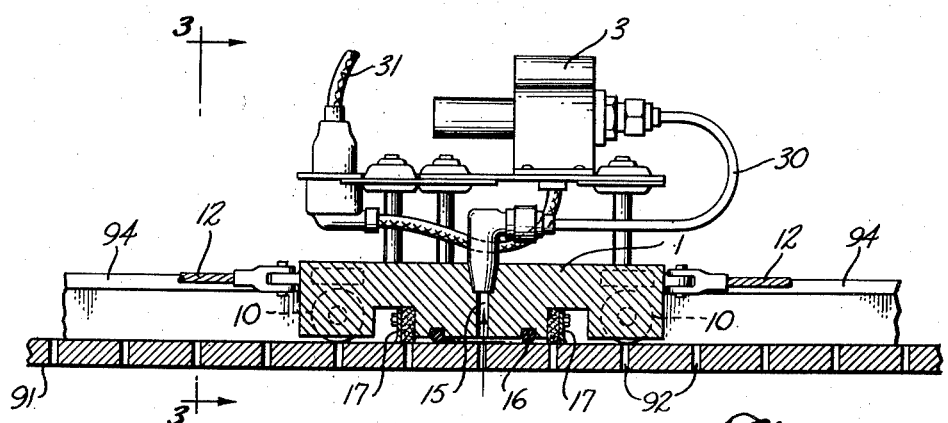
Figure 2 is a section longitudinally of the wind tunnel wall, illustrating the line of apertures, and through the ported carriage cooperating therewith.
Figure 3:
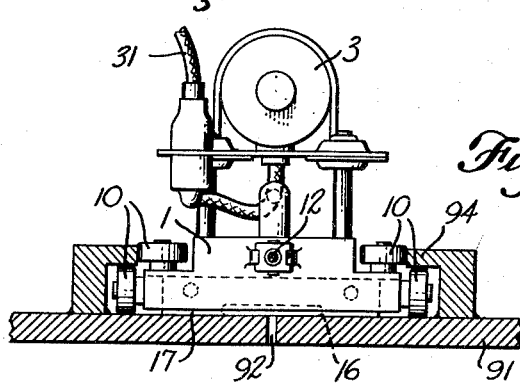
Figure 3 is a transverse section, taken substantially at the line 3—3 of Figure 2, illustrating the same parts and their relationship.

The wind tunnel is diagrammatically represented at 9 and its test section or throat at 90. The arrow indicates the direction of air flow. One wall 91 is apertured at frequent and preferably at regular intervals, as is best shown in Figure 2. In an actual example, there are one hundred sixty such apertures 92, arranged at spacings of one inch. In another wall, as for instance, at 93, there may be provided an impact pressure pickup 8, facing in the direction to receive the full impact of the air flow.

A carriage 1 is supported exteriorly of the wind tunnel wall 91, and guided, as for instance by the guides 94 and the rollers 10, for advancement along the line of the apertures 92. Its movement may be effected by any suitable means, such as that typified by the motor 11 and the endless cable 12 connected to the carriage and extending, at the end opposite the motor 11, over a guide pulley 13.

The carriage 1 is provided with a single port 15, which is positioned to register successively with the individual apertures 92 as the carriage advances along the line of apertures. In order to prevent communication between the port 15 and more than one such aperture at any given time, the carriage, surrounding its port 15, is circularly recessed to receive a sealing O-ring 16, which travels with the carriage. A wiper 17 serves to wipe clear the surface of the wind tunnel wall in advance of arrival of the port 15 in registry with any aperture 92.

Figure 1:
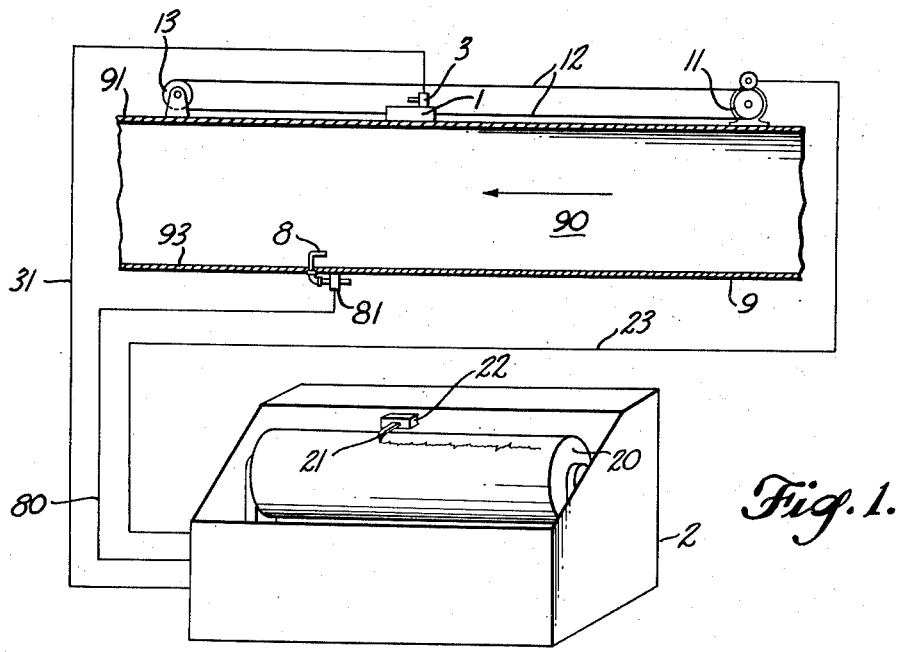
Figure 1 is a diagrammatic representation in section of a wind tunnel and of a carriage movable along a line of apertures therethrough, together with a conventional representation of the commercially available Moseley Autograf recording mechanism such as can be employed for recording the desired data, and illustrating diagrammatically the operative connections between the two.

It will be seen from the mechanism so far described that the port 15 constitutes a traveling pressure pick-up capable of sensing the pressure through each individual aperture 92 in turn. It is intended that the carriage should travel quite rapidly from one end to the other of the apertures, and in the instance mentioned above, the carriage is intended to travel the approximately one hundred sixty inches in ten seconds. Since, then, the pressure pick-up or sensing port 15 is capable of sensing individually the pressure at each successive aperture, it becomes a comparatively simple matter to transfer each individual pressure so sensed to a recorder of the type referred to above. Such a recorder is indicated generally in Figure 1 by the numeral 2, and is commercially available. It includes a mark-receiving surface, such as the surface of a drum 20, which preferably is marked off, in sections corresponding to the individual apertures 92, in the axial direction. The recorder incorporates also a stylus 21, mounted upon a carriage 22, whereby the stylus is caused to traverse the width of the marking surface of the drum, and the carriage 22 is connected, through the operative connection diagrammatically illustrated at 23, to the motor 11 whereby the carriage 22 traverses its marking surface at the same rate and in precise accordance with the advancement of the carriage 1 along the line of apertures 92.

While the carriage 22 is thus moving across the marking surface, this surface itself is caused to vibrate or oscillate, so as in effect to cause deflection of the stylus 21 with relation to a datum line which would be a straight line across the width of the chart. Such oscillation of the drum may be effected solely as a result of pressure differences sensed through the port 15, or it may be made to occur as a result of comparison of such pressure differences at the individual ports with the impact pressure sensed at the pressure pickup 8. Thus the impact pressure pickup 8 is operatively connected to the drum to oscillate it by an operative connection indicated at 80, and in known manner, and the port 15 is operatively connected to the drum also, in order to effect its oscillation, by suitable means such as the pressure sensitive means such as the transducer 3, which may be mounted upon the carriage and connected by a conduit 30 to the port 15, and by the operative connection such as an electric circuit means indicated at 31, also in known manner. Since the operative connections and circuits and the recorder 2 are all known and commercially available, it has not been considered necessary to illustrate these in detail, or to do more than merely to indicate them diagrammatically.

In operation, the carriage 1 is initially located at one end of the line of apertures 92, and the stylus 21 at the corresponding edge of the marking surface. Upon the initiation of a recording the motor 11 is energized to cause the advancement of the carriage along the line of apertures. Energization of the motor 11 acts through the operative connection at 23 to initiate exactly corresponding traverse of the carriage 22 and stylus 21 which forms part of the recording mechanism. As the carriage 22 advances, the pressure transducer 3 receives pressure differences as sensed by the port 15, and transmits corresponding signals by way of the operative connection 31 to the drum 20 to cause its deflection with relation to the path of advance of the stylus 21. If the impact pressure is to be incorporated as a factor affecting the position of the chart, the operative connection 80 is brought into operation, and in this case the deflection of the chart becomes a combined function of the instantaneous pressure at each aperture 92 and the impact pressure as sensed at the impact pressure pickup 8.

The entire operation is capable of completion in ten seconds over a length of one hundred sixty inches in the particular installation mentioned, a reading being recorded for each inch of length. Moreover, the recorder 2 leaves a permanent and immediately available record, and it is a very simple matter to complete in a short space of time a series of tests, each successive test dependent, perhaps, on the results of previous tests, which under ordinary conditions of visual observation and manual recording would require a number of hours, or which with photographic recording would still take about the same length of time. This is of great importance in wind tunnel testing operations, if for no other reason than that the cost of operation per hour is extremely high, and it is, therefore, highly essential to reduce the time required in all feasible ways.

We claim as our invention:

1. In combination with the wall of a wind tunnel which has a plurality of through apertures aligned at intervals spaced lengthwise of the direction of airflow, a carriage guided for advancement along the line of apertures, and having a port located in position to register with successive single apertures during such advancement, means so to advance the carriage, pressure-sensitive means operatively connected to said port, and recording means including a traveling stylus operatively connected to move in correspondence with the carriage, and a record sheet operatively connected to said pressure-sensitive means to shift relative to the stylus' path in accordance with pressure differences at successive ports, thereby to record the pressure sensed by the pressure-sensitive means as the port comes into registry with each successive aperture during advance of the carriage along the line of apertures.

2. The combination of claim 1, including an impact pressure pickup means within the tunnel throat, positioned to be subject to impact pressure therein, a pressure transducer operatively connected to said impact pressure pickup means, and means operatively connecting said pressure transducer to the record sheet, to shift the latter in coordination with its shifting by the carriage-mounted pressure-sensitive means, to constitute a datum wherewith to compare differences in pressure as sensed through the individual apertures.

3. The combination of claim 1, wherein the record sheet of the recording means includes a chart lined in correspondence with individual apertures, means to guide the stylus for movement across said chart transversely to such lines, means operatively connecting the carriage and the stylus guiding means for advancing the latter and its stylus across the chart by the distance between two lines in correspondence with advancement of the carriage's port past the successive apertures, and an operative connection between the pressure-sensitive means and the chart, to shift the latter in the direction of the lines in correspondence with pressure differences sensed between successive ports.

4. The combination of claim 1, wherein the carriage is recessed about its port, in its face adjoining the exterior of the wind tunnel's apertured wall, and a sealing ring received in such aperture, bearing between said wall and the bottom of the recess as it slides with the carriage along the line of apertures, and of a diameter such, with relation to the spacing between apertures, to enclose only one aperture at a time.

5. In combination with the wall of a wind tunnel which has a plurality of aligned apertured therethrough spaced in the direction of airflow, a carriage formed with a single port, means guiding said carriage for advancement along the line of apertures, to bring its port successively into registry with each such aperture, means so to advance the carriage, a recorder located distantly from said carriage, and including a mark-receiving surface, a stylus mounted and guided for traversing movement in a fixed path across such surface, means operatively connecting said carriage and said stylus to effect traversing movement of the stylus in correspondence with advancement of the carriage, a pressure-sensitive means operatively connected to, and sensitive to differences of pressure impressed upon said port as the same registers with successive apertures, and an operative connection between said pressure-sensitive means and said mark-receiving surface, to effect deflection of said surface relative to the path of the stylus during its traverse, in correspondence to the pressure differences so sensed.

6. The combination of claim 5, including a second pressure sensitive element positioned to sense impact pressure within the wind tunnel, and an operative connection between said second pressure sensitive element and the mark-receiving surface, to effect deflection of the latter relative to the path of the stylus as a combined function of the impact pressure and of the instantaneous pressure at the successive apertures.

References Cited in the file of this patent

UNITED STATES PATENTS

| | | |
|---|---|---|
| 1,768,563 | Brown | July 1, 1930 |
| 2,377,605 | Binckley | June 5, 1945 |
| 2,423,340 | Pellettere | July 1, 1947 |
| 2,551,526 | Campbell | May 1, 1951 |
| 2,604,786 | Huzel | July 29, 1952 |

FOREIGN PATENTS

| | | |
|---|---|---|
| 495,002 | Canada | Aug. 4, 1953 |

OTHER REFERENCES

Stevens publication, "Hypersonic Research Facilities at the Ames Aeronautical Lab.," Journal of Applied Physics, vol. 21, November 1950, pages 1150–1155. Copy in 73–147.

Agard Memorandum AG 3/M2, "Methods Used by NACA for Data Reduction," by I. H. Abbott, pub. December 1952, pp. 6, 7, 8 and 15. Copy in 73–147.